This invention relates to apparatus for testing the fuel pumps of compression ignition engines in order to determine whether their output is correct.

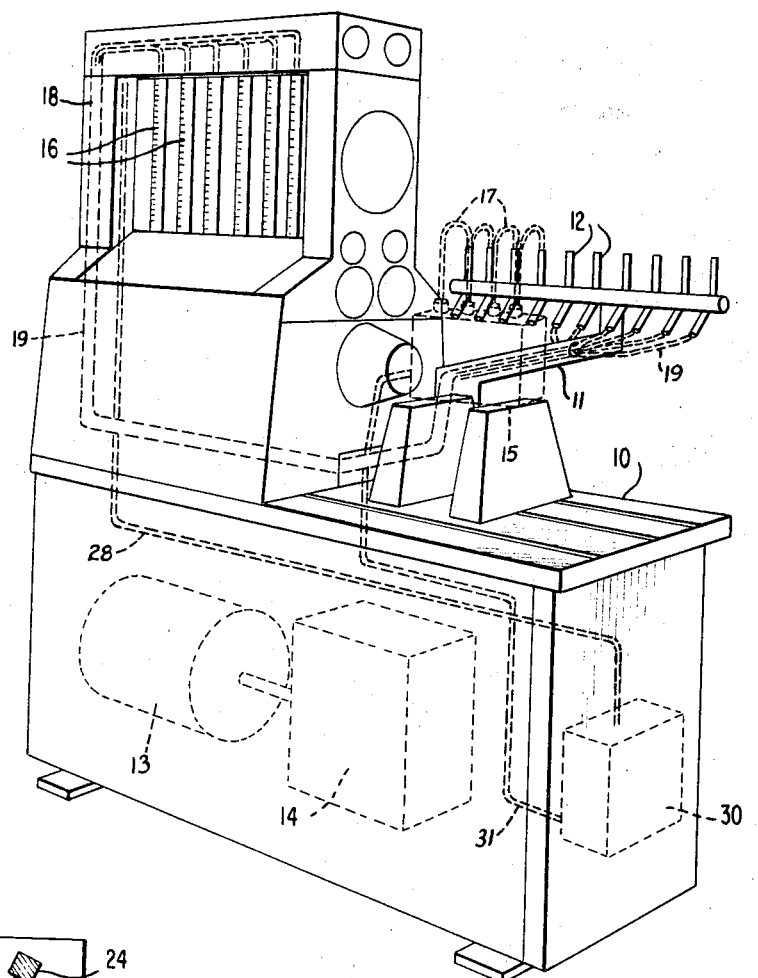
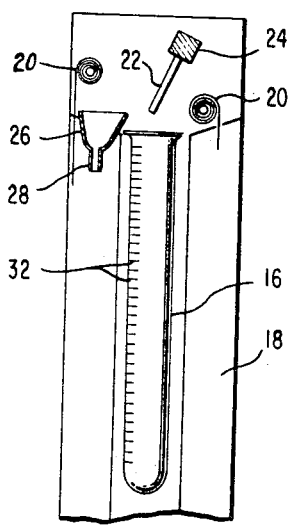
FIG.1
FIG.2
INVENTOR
REGINALD STANLEY EMERSON
BY *Imirie and Smiley*
ATTORNEYS 3,395,575
APPARATUS FOR TESTING THE FUEL PUMPS
OF COMPRESSION IGNITION ENGINES
Reginald S. Emerson, 34 Highlands Road, Buckinghamshire, Buckingham, England
Filed Oct. 12, 1965, Ser. No. 495,233
Claims priority, application Great Britain, Oct. 14, 1964, 41,913/64
7 Claims. (Cl. 73—119)

Fuel-pump testing apparatus generally comprises one or more fuel injectors which receive fuel from the pump under test, and variable speed driving means for driving the pump. The fuel delivered by the injectors enters one or more chambers which lead to a series of calibrated test tubes which allow readings to be taken of the quantities of fuel thus injected.

In the great majority of cases, the calibrated tubes are arranged in a so-called calibrator head which is mounted at eye level on some part of the apparatus. Thus, in one form of apparatus the test tubes are arranged in a row on the pump mounting bed plate so as to lie parallel to the longitudinal axis of the pump, the tubes being located behind the pump on the opposite side of the test bench from the operator so as to face him. This arrangement suffers however from the disadvantage that if both the injection pump and the tubes are at a convenient height for working, the view of the tubes is partly obscured by the high pressure delivery pipes which usually issue from the top face of the pump. A further disadvantage is that work can be carried out from one side only of the test bench. This is of considerable importance, as fuel injection pumps are usually manufactured so as to be either "left-handed" or "right-handed," that is to say, the parts of the pump which are adjusted while the pump is on the test bench lie either on one side or on the other side of the pump with respect to its driving coupling. For this reason certain other forms of test bench are made "double-sided" so that testing of a fuel pump can be carried out from that side of the bench which is appropriate to the design of the pump being tested. This is often done by arranging the test tubes in a row transversely across the test bench, the row of tubes being above and at right angles to the driving coupling axis. This arrangement facilitates reading of the graduations on the test tubes from either side of the test bench, but it still has the disadvantage of giving the operator only an oblique view of the graduations.

The aim of the present invention is to provide fuel pump testing apparatus in which the calibrated test tubes are so arranged that they can be read easily and accurately from one side or the other of the apparatus, and according to the invention the test tubes are arranged in an upright position in a frame which is open at both sides and so located on the apparatus that the calibrated test tubes can be ready easily from either side of the apparatus.

An example of apparatus in accordance with the invention is shown in the accompanying drawing, in which:

FIGURE 1 is a perspective view of the apparatus, and

FIGURE 2 is an enlarged section through the upper part of the apparatus.

The apparatus shown in the drawing takes the form of a bench 10 provided with a nozzle-supporting arm 11 on which is mounted a battery of fuel injection nozzles 12. A driving motor 13 and variable-speed driving means 14 are arranged in the bench so that the pump 15 under test can be driven at the desired rate, the delivery side of the pump being connected by flexible conduit means 17 to the upper ends of the fuel injection nozzles 12. The calibrated test tubes 16 are arranged in a line at eye level on the bench 10, the stationary frame 18 in which they are secured being part of the bench casing or being secured to the bench. In order to facilitate reading of the calibrated test tubes, a blind or screen 20 is provided in the frame on each side of the tubes 16 so as to form a "backing" which can be pulled down or otherwise located on either side of the test tubes 16. The screen 20 is best made of a white opaque material, and we have found that a flexible paperlike synthetic plastic is very satisfactory.

The fuel is supplied to the test tubes 16 through their open upper ends by means of flexible conduits 19 which lead from the lower ends of the injection nozzles 12, and for this purpose each tube has a delivery spout 22 arranged immediately above it. These delivery spouts are ganged together on a bar 24 and are mounted for limited rotary movement about a substantially horizontal axis. This allows them to be moved into a position where they deliver fuel into the calibrated test tubes 16, and to be moved into another position in which they deliver fuel into a trough 26 which is provided with a drain passage 28 leading back to the fuel reservoir 30. The fuel reservoir has an outlet joined to a fuel passage 31 which is adapted to be connected to the fuel inlet of the pump 15.

Due to the fact that the test tubes 16 may be read from either side of the bench 10, it is necessary that the graduations 32 on the tubes should not extend around their entire circumference, as otherwise some difficulty is experienced in making a correct reading of the level of liquid in the test tubes. To meet this difficulty, the test tubes are provided with graduations 32 which extend around the circumference of the test tubes by not more than 200°, the appropriate numbers indicating the quantity of the fuel in each test tube being marked at each side of the tubes.

It will thus be seen that, without any undue complication, the test tubes 16 can be read accurately and easily from either side of the bench 10, thus permitting an operator to work from either side of the bench or from whichever side is more convenient should the bench have to be placed near a wall for want of space.

I claim:
1. Apparatus for testing the fuel pumps of compression ignition engines comprising: a bench adapted to support a pump to be tested, said pump having a fuel inlet and fuel outlet means, a plurality of fuel injectors mounted on said bench each having an inlet and an outlet, first conduit means connecting said fuel outlet means of the pump to the inlets of said injectors, a series of calibrated test tubes supported on said bench, second conduit means connected to said outlets of the injectors and leading to said test tubes, driving means carried by said bench and adapted to be drivingly connected to said pump to be tested, a fuel reservoir carried by said bench and provided with a fuel outlet, a fuel-passage leading from said outlet in said fuel reservoir and adapted to be connected to said fuel inlet of said pump, a stationary upright frame on said bench wherein said calibrated test tubes are arranged in an upright position, said frame being open at both sides and being disposed longitudinally of said bench in a prominent position whereby said calibrated test tubes may be read easily from either side of said bench.

2. Apparatus according to claim 1, characterized in that the calibrated test tubes are arranged in a line at eye level on the apparatus.

3. Apparatus according to claim 1, characterized in that at least one blind or screen is provided in the frame so as to form a backing which can be pulled down or otherwise located on either side of the test tubes.

4. Apparatus according to claim 1, characterized in that fuel is supplied to the test tubes through their open upper ends, there being a fuel delivery spout arranged immediately above each tube.

5. Apparatus according to claim 4, characterized in that the delivery spouts are ganged together and are mounted for limited rotary movement about a substantially horizontal axis.

6. Apparatus according to claim 4, characterized in that the delivery spouts are movable into one position where they deliver fuel into the test tubes and into another position where they deliver fuel into a trough provided with a drain passage leading back to a fuel reservoir.

7. Apparatus according to claim 1, characterized in that the test tubes are provided with graduations which extend around the circumference of the test tubes by not more than 200°.

References Cited

UNITED STATES PATENTS

| | | | |
|---|---|---|---|
| 3,246,509 | 4/1966 | Hauck | 73—119 |
| 3,264,868 | 8/1966 | Hainz | 73—119 |

FOREIGN PATENTS

| | | |
|---|---|---|
| 374,335 | 8/1939 | Italy. |
| 474,473 | 3/1950 | Italy. |
| 558,195 | 2/1957 | Italy. |

RICHARD C. QUEISSER, *Primary Examiner.*

JERRY W. MYRACLE, *Assistant Examiner.*